United States Patent
Shigeta et al.

[15] 3,641,832
[45] Feb. 15, 1972

[54] WORM-GEAR-TYPE SPEED REDUCTION DEVICE FOR AN ELEVATOR

[72] Inventors: Masayuki Shigeta; Katsumi Aoki, both of Katsuta, Japan

[73] Assignee: Hitachi, Ltd., Tokyo, Japan

[22] Filed: Mar. 20, 1970

[21] Appl. No.: 21,312

[30] Foreign Application Priority Data

Mar. 26, 1969 Japan..................................44/22351
Oct. 17, 1969 Japan..................................44/82564

[52] U.S. Cl. ..................................74/427, 74/411, 187/20
[51] Int. Cl. ...................F16h 1/16, F16h 57/00, B66b 11/04
[58] Field of Search......................74/427, 411; 187/20, 27; 254/170

[56] References Cited

UNITED STATES PATENTS

| | | | |
|---|---|---|---|
| 2,914,959 | 12/1959 | Fawick | 74/411 |
| 2,879,418 | 3/1959 | Ennis | 74/411 X |
| 3,132,531 | 5/1964 | Boughner | 74/411 X |
| 3,159,045 | 12/1964 | Lohr | 74/411 |
| 1,037,205 | 9/1912 | Clark | 74/427 |
| 1,125,133 | 1/1915 | Larsson | 187/20 |
| 1,140,369 | 5/1915 | Gale, Sr. | 74/427 |

FOREIGN PATENTS OR APPLICATIONS

| | | | |
|---|---|---|---|
| 122,996 | 3/1944 | Australia | 74/411 |

*Primary Examiner*—Carlton R. Croyle
*Assistant Examiner*—Thomas C. Perry
*Attorney*—Craig, Antonelli and Hill

[57] ABSTRACT

An elevator including a worm-gear-type speed reduction device which comprises a worm and a worm wheel, said device further including a resilient member for receiving a thrust load on the worm whereby the misalignment of the gearing engagement between the worm and the worm wheel is converted into an axial displacement of the worm shaft and absorbed by said resilient member so that a vibration and noises of a cage caused by a fluctuation of rotation in the wheel shaft are prevented.

8 Claims, 14 Drawing Figures

PATENTED FEB 15 1972

INVENTORS
MASAYUKI SHIGETA and KATSUMI AOKI

BY Craig, Antonelli, Stewart & Hill
ATTORNEYS

INVENTORS
MASAYUKI SHIGETA and KATSUMI AOKI

BY
Craig, Antonelli, Stewart & Hill

A WORM-GEAR-TYPE SPEED REDUCTION DEVICE FOR AN ELEVATOR

The present invention relates to an elevator provided with a worm-gear-type speed reduction device.

A worm-gear-type speed reduction device used in an elevator is usually disposed between a pulley around which wire ropes hanging a cage are passed and a motor which is normally a three-phase induction-type motor, so that the motor rotation is reduced in speed and transmitted to said pulley.

In a conventional worm-gear-type speed reduction device, a worm shaft is rigidly supported at their opposite ends or one side end by thrust bearing means, so that a fluctuation of the worm wheel rotation caused by a misalignment in engagement between the worm and the worm wheel of the worm-gear-type speed reduction device is transmitted to the pulley directly connected to the worm wheel. Since the wire ropes for the main cable (hereinafter simply referred to as "rope") is passed around the pulley, the fluctuation of the worm wheel rotation will cause a vibration of the cage and noises with the result that the comfortability of the elevator is adversely affected.

The first object of the present invention is to eliminate a fluctuation of the worm wheel rotation which is the cause of a vibration and noises in the cage.

Another object of the present invention is to accomplish said first object by means of a simple arrangement.

The first object is accomplished by providing a resilient member for receiving a thrust load on the worm whereby a misalignment in gearing engagement between the worm and the worm wheel is converted into an axial displacement of the worm shaft and absorbed by said resilient member.

Further, in a preferred embodiment of the present invention, the resilient member is disposed between the worm shaft and the motor shaft and a thrust bearing is provided on the motor shaft. The resilient member may be a leaf spring or a rubber member and, in one embodiment of the present invention, a cylindrical rubber member is used. The resilient member allows an axial displacement of the worm shaft and, according to the inventor's experiments, the worm shaft was actually displaced by a distance as long as 10 mm. Therefore, it is recommended to slidably support the worm shaft by plane bearing means.

Figure 1:
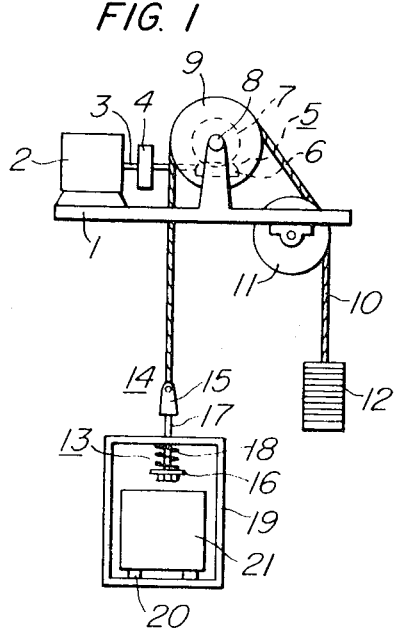
FIG. 1 is a diagrammatical side view of a typical elevator provided with a worm-gear-type speed reduction device to which the present invention may be applied.

Referring to FIG. 1 showing a typical example of an elevator provided with a worm-gear-type speed reduction device, a traction machine base 1 carries a motor 2 mounted thereon and having a rotatable shaft 3 connected with a brake drum 4 and a worm-gear-type speed reduction device 5. The worm-gear-type speed reduction device 5 comprises a worm 6 and a worm wheel 7, said worm wheel 7 having a worm wheel shaft 8 connected with a pulley 9. Ropes 10 are passed around the pulley 9 and the around a guide pulley 11, and have at their opposite ends a balance weight 12 and a cage assembly 13.

The end 14 of the ropes includes rope sockets 15 and rods 17 which have spring supports 16 comprising nuts and spring sets provided at the threaded portion of the rods 17. Resilient members 18 which usually are coil springs are inserted between the rope ends 14 and a frame 19, and a cage 21 is connected to said frame 19 through resilient members 20.

In the elevator constructed as described above, any misalignment in gearing engagement in the worm-gear-type speed reduction device 5 causes a fluctuation in the rotation of the worm wheel 7 whereby a vibration and noises are produced in the cage 21.

The misalignment in gearing engagement is produced due to the manufacturing tolerance of the worm 6 and the worm wheel 7, the assembling tolerance and strain caused by the operational load, and it has been found to be difficult to eliminate these causes of the misalignment and to produce a speed reduction device of minimum tolerance. Therefore, in a conventional elevator, the spring modulus of the resilient members 18 and 20 has hitherto been reduced in order to minimize the vibration transferred to the cage 21.

However, in such an arrangement, when some load is applied to the cage 21, the deflection of the resilient members 18 and 20 is increased so that the cage is at a position in which its floor is out of alignment with the floor of the building. Thus, the reduction of the spring modulus of the resilient members 18 and 20 is limited from the view point of safety. Therefore, the problem of vibration and noises cannot be solved unless the fluctuation of the worm wheel rotation due to the misalignment in gearing engagement in the worm-gear-type speed reduction means 5 is reduced.

Figure 2:
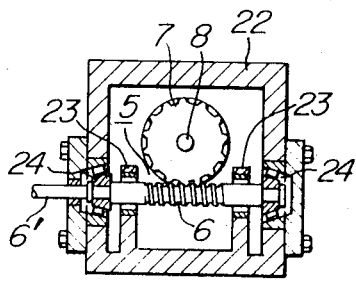
FIG. 2 is a sectional view of a conventional worm-gear-type speed reduction device.
Figure 3:
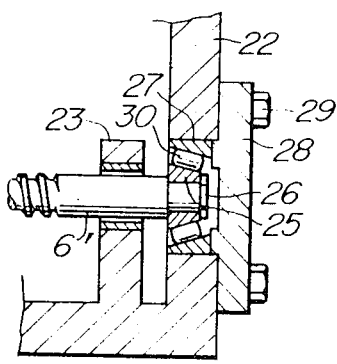
FIG. 3 is a fragmentary detail view of the device shown in FIG. 2.
Figures 4A, 4B:
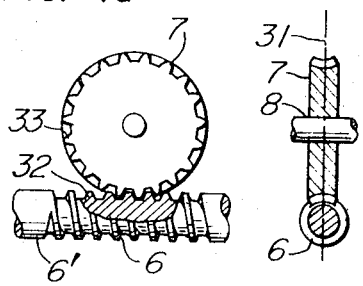
FIGS. 4a and 4b show the relationship between the worm and worm wheel.

In FIG. 2 which shows an example of a known worm-gear-type speed reduction device 5, radial bearings 23 and thrust bearings 24 for the worm 6 are provided in a gear housing 22. In some cases, the radial bearing 23 and the thrust bearing 24 may be made as a unit. In FIG. 3, a detail view of the thrust bearing 24 is shown. A rotatable race 25 for the thrust bearing is secured to the worm shaft 6' by means of a clip ring 26, while a stationary race 27 for the thrust bearing is secured to the gear housing 22 by means of an end plate 28 which is rigidly mounted on the gear housing 22 by means of bolts 29. A series of rollers or balls are disposed between the rotatable and stationary races 25 and 27 of the thrust bearing. In such an arrangement of the worm-gear-type speed reduction device, the axial displacement of the worm 6 is limited to an amount equivalent to the elastic deformation of the thrust bearings of the worm 6 caused by the load imparted thereto from the worm wheel 7. Therefore, when the worm shaft 6' is driven by the motor 2, the worm wheel 7 is caused to rotate. Although the plane of the teeth of the worm wheel 7 is an envelope plane of the teeth plane of the worm 6 and is rather complicated, when it is considered with respect to a section 31 taken perpendicularly to the worm wheel shaft 8 as shown in FIGS. 4a and 4b, the gearing engagement between the worm 6 and the worm wheel 7 are regarded as a rack and a pinion, the section of the worm 6 being deemed as a rack 32 and the section of the worm wheel 7 as a pinion 33. Therefore, since the worm 6 which corresponds to the rack 32 is secured against axial movement, the misalignment in gearing engagement causes a fluctuation in the rotation of the worm wheel 7 which corresponds to the pinion 33 in FIGS. 4a and 4b.

Figure 5:
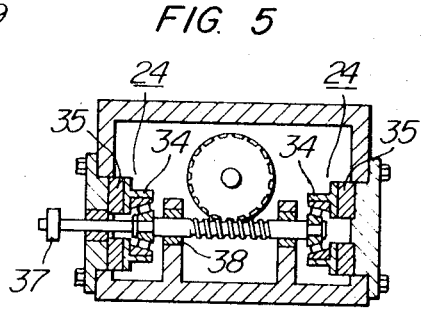
FIG. 5 is a sectional view showing the principle of the present invention.

In this arrangement, if a resilient member 35 such as a rubber body or a metallic spring is provided on a seat 34 of the stationary race 27 of the thrust bearing 24 as shown in FIG. 5 for transmitting the thrust force on the worm shaft 6' through this resilient member 35 to the gear housing 22 to be supported thereby, the worm 6 is allowed to some extent to move in the axial direction. In this case, it is necessary to provide an axially movable flexible coupling 37 between the motor shaft 3 and the worm shaft 6' so that the worm 6 is allowed to move axially, and also it is necessary to carry the worm 6 by an axially slidable radial bearing such as a plane bearing 38. In such an arrangement, a misalignment in gearing engagement between the worm 6 and the worm wheel 7 is represented by the sum of the amplitude of an axial oscillation of the worm 6 and the fluctuation of the rotation of the worm wheel 7. The frequency of this oscillation and that of the fluctuation are substantially represented by N/60 Hz. and N·Z/60 Hz., where N is the rotational speed of the motor 2 in r.p.m. and Z is the number of leads on the worm 6.

For these frequencies, when the spring modulus of the resilient member 35 is selected to such a value under which the worm 6 can perform an axial movement with the easiest manner, the fluctuation of the rotation of the worm wheel 7 can be eliminated.

Hithertofore, a lot of time and labor have been spent for precise gearing of the teeth of the worm 6 and the worm wheel 7, for precise manufacturing of the gear housing and for precise assembling of these parts in order that the fluctuation of the worm wheel rotation due to the misalignment in meshing engagement can be reduced, however, according to the arrangement of the present invention, such a fluctuation of the worm wheel rotation can be prevented without being affected by the accuracy of the gear teeth and the assembly. Particularly, in case where a three phase induction motor is used as the motor 2, since the torque control is generally difficult as compared with a direct current motor, a stepwise torque is applied to the worm 6. For this reason, during acceleration, deceleration and stopping in elevator operation, a substantial torque variation is encountered, with the result that the cage 21 is subjected to a heavy vertical vibration so that the comfortability of the elevator is adversely affected.

However, according to the present invention, since the thrust load on the worm 6 is transmitted through a resilient member and the worm 6 is allowed to move axially in plane bearings 38, the worm 6 is axially displaced in response to an abrupt torque variation to absorb the variation of the torque applied to the worm wheel 7, whereby the vertical vibration of the cage can be effectively prevented. Further, according to the arrangement of the present invention, since the modulus of elasticity in the axial direction of the worm 6 is reduced, the frequency of the vertical vibration of the cage is reduced so that the differential rates of acceleration during the acceleration, deceleration and stopping period of the elevator can be reduced and the comfortability can well be increased.

If the worm 6 is not axially supported by the resilient member, the frequency of the vertical vibration of the cage 21 varies in accordance with the change of the length of ropes portion at the side of the cage assembly 13. However, according to the arrangement of the present invention in which the worm 6 is axially supported by a resilient member, the frequency of the vertical vibration of the cage 21 is substantially determined in dependence on the weights of the cage assembly 13 and the balance weight 12, the length of the ropes 10 connecting them together, the springs 18 and the resilient member 35, and thus the frequency practically does not change in accordance with the height of the cage. Therefore, according to the present invention, in a torque control system in which a primary or secondary resistance is stepwisely changed to provide a stepwise torque as is often employed in torque control for a three phase induction motor, the time interval of the torque pulses can easily be determined so that the vertical vibration of the cage 21 is reduced to a minimum.

Figure 6:
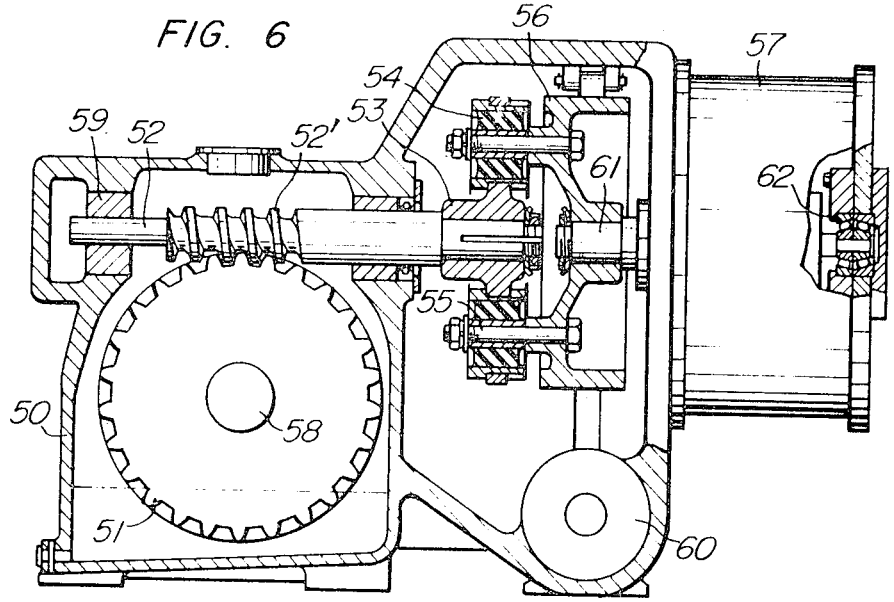
FIG. 6 is a partially cutaway elevational view showing the detail of a practical embodiment of the present invention.

The principle of the present invention has thus been described with reference to FIG. 5, and a practical arrangement of the resilient member will now be described with reference to FIG. 6. In a gear housing which is generally represented by the reference numeral 50, there are disposed a worm wheel 51, a worm shaft 52 having a worm 52', a coupling 53 integrally secured to the worm shaft 52, a plurality of cylindrical vibration absorbing rubber members 54 provided between the worm shaft 52 and the motor shaft 61 and engaging the coupling 53 by their outer cylinders at angularly spaced portions (in the illustrated embodiment, at four equispaced positions) of the coupling, and a drum coupling 56 rigidly secured to the motor shaft 61. The drum coupling 56 and each of the rubber members 54 are connected with each other by a bolt 55 which is axially inserted into the rubber 54. The worm wheel 51 has a shaft 58 to which a pulley for a cage carrying rope is rigidly secured. The gear housing 50 has plane bearings 59 for supporting a radial load on the worm shaft 52. Further, within the gear housing 50, there is provided a brake magnet portion 60 which is adapted to apply a braking effort to the outer periphery of the drum coupling 56 when energized and release it when deenergized. The reference numeral 57 shows a motor, and 62 a thrust bearing.

According to the above-described arrangement, a misalignment in gearing engagement between the worm wheel 51 and the worm 52' causes the axial displacement of the worm shaft 52 and the axial displacement is absorbed by the cylindrical rubber members 54. Therefore, the oscillation due to the misalignment in gearing engagement is not transmitted to the worm wheel 51. Further, according to this arrangement, only one thrust bearing is required on the motor shaft, so that the mechanism can be simplified and the manufacturing cost can be reduced. Moreover, it is not necessary to worry about the deterioration due to the oil or temperature in the worm-gear-type speed reduction device.

Figure 7:
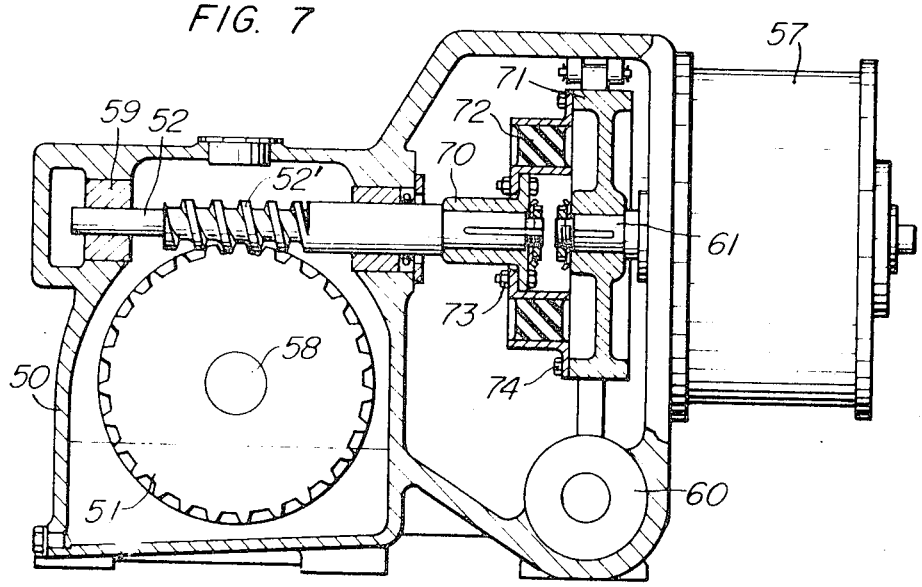
FIG. 7 is a sectional view of another embodiment of the present invention.

FIG. 7 shows another embodiment of the present invention in which a cylindrical vibration absorbing rubber member 72 is secured between a coupling 70 fixed to the worm shaft 52 and a drum coupling 71 fixed to the motor shaft 61 through a plurality of fastening bolts 73 and 74. According to the arrangement, it is not necessary in assembling the device to be careful to locate several rubber members at symmetrical positions as in the previous embodiment. In FIG. 7, parts corresponding to those in the embodiment shown in FIG. 6 are represented by the same reference numerals as in FIG. 6.

The modulus of elasticity $K$ of the resilient member used in the present invention is selected within the range determined by the equation, $$K = Kw \times (R_s/R_w)^2 \times (0.5-10) \text{ kg./cm.}$$

where; $Kw$ is the modulus of elasticity (rated load/cm.) is the rated load, $Rs$ is the radius of the pulley, and $Rw$ is the pitch radius of the worm wheel.

With the modulus of elasticity $(K)$ above the upper limit value $K = Kw \times (Rs/Rw)^2 \times 10$, the objects of the invention cannot be achieved and, with the value $(K)$ below $K = kw \times (Rs/Rw)^2$ 0.5, the cage is excessively subsided resulting in a misalignment between the floor of the cage and that of the building. A recommendable range can be represented by the equation $K = Kw \times (Rs/Rw)^2 \times (2-8)$.

Figure 8A:
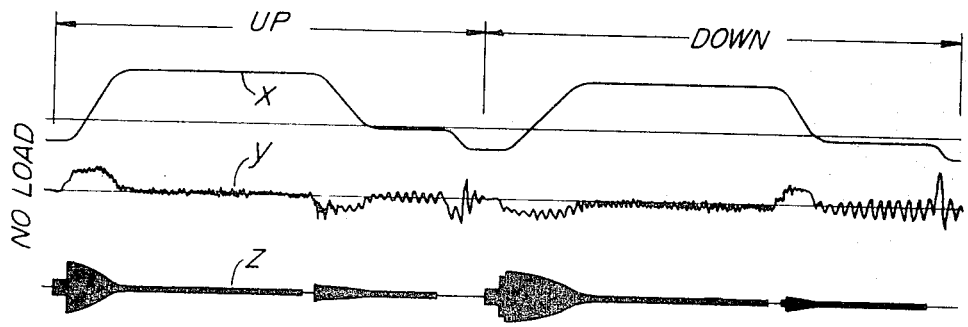
FIGS. 8a, 8b and 8c are diagrams showing a vertical acceleration in the cage having a conventional speed reduction device.
Figure 8B:
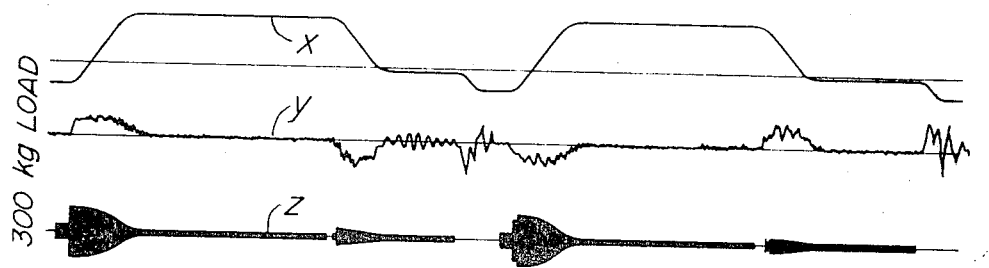
Figure 8C:
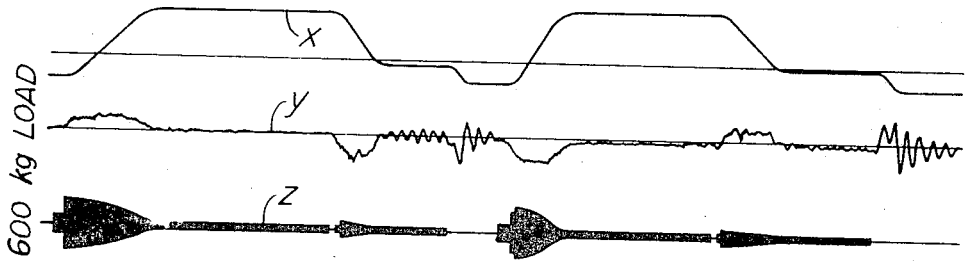
Figure 9A:
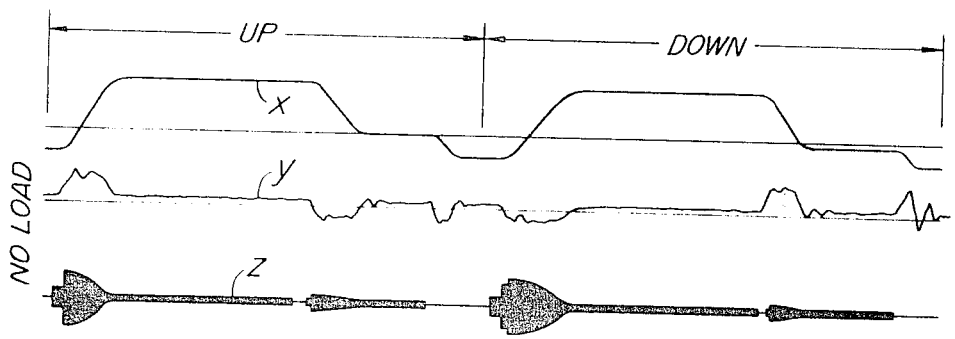
FIG. 9a, 9b, and 9c are diagrams showing a vertical acceleration in the cage having a speed reduction device shown in FIG. 6.
Figure 9B:
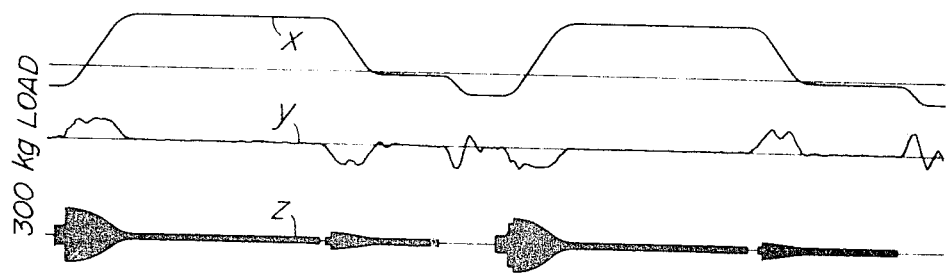
Figure 9C:
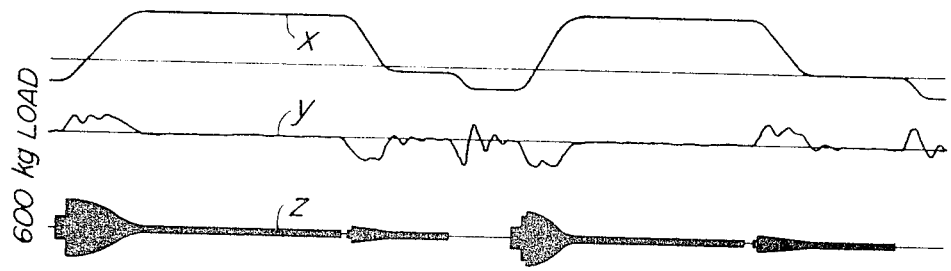

The advantageous results obtained by the present invention will now be described with reference to FIGS. 8a, 8b, 8c and 9a, 9b and 9c. In FIGS. 8a, 8b and 8c, several vertical acceleration characteristics of the elevator cage utilizing a conventional worm-gear-type speed reduction device are shown in diagrammatical form, and FIG. 8a represents the characteristics during no-load operation, FIG. 8b the characteristics with 300 kg. load, and FIG. 8c the characteristics with 600 kg. load. In each of these drawings, the left half part shows the characteristics during ascending and the right half part the characteristics during descending with a stroke 16 m. In these drawings, the curves $x$ represents the operational performance of the cage, the curves $y$ the vertical acceleration performance of the cage, and the numeral $z$ the primary current in the three-phase induction motor. Each diagram of FIGS. 9a, 9b and 9c is similar to that in FIGS. 8a, 8b and 8c but represents the performance when a worm-gear-type speed reduction device of the present invention as shown in FIG. 6.

As seen from the curves $y$ in FIGS. 8a, 8b and 8c which represent the vertical acceleration performance of the cage, the conventional device is accompanied with an intense vertical vibration and, has an adverse effect on the comfortability of the elevator and produces an excessive noises. In contrast to this, according to the present invention, as seen in the curves $y$ in FIGS. 9a, 9b and 9c, the cage is substantially free from vertical vibration. Thus, it will be understood that the present invention is effective to increase the comfortability and reduce undesirable noises.

We claim:

1. An elevator including a motor for lifting a cage by transmitting the motor power to the cage through a rope passing around a pulley, said pulley being driven by the motor through a worm-gear-type speed reduction device; said speed reduction device comprising a worm shaft operatively engaging with a worm wheel to turn said pulley, said worm shaft being supported for axial and rotative movement by a plane bearing, resilient means disposed between said worm shaft and said motor for permitting axial displacement of said worm shaft in response to axial forces caused by misalignment of the respective gearing on said worm shaft and said worm wheel and a thrust bearing provided on said motor for receiving thrust forces acting on the worm shaft.

2. An elevator according to claim 1, wherein said resilient means comprises a plurality of cylindrical rubber members arranged symmetrically with respect to each other between a coupling provided on the end of the worm shaft adjacent the motor and coupling provided on a motor shaft adjacent the worm.

3. An elevator in accordance with claim 1 which further comprises a coupling secured to the end of the worm shaft adjacent to the motor, and another coupling secured to the end of the motor shaft adjacent to the worm, the couplings being connected with each other through said resilient means, said resilient means comprising at least one cylindrical rubber member which is subjected to shearing deformation to allow an axial displacement of the worm shaft.

4. An elevator in accordance with claim 1 in which the modulus of elasticity ($K$) of the resilient member is within the range determined by the equation:

$$K = Kw \times (Rs/Rw)^2 \text{ (0.5 to 10)}$$

where: $Kw$ is the modulus of elasticity (rated load/cm.).
$Rs$ is the radius of the pulley, and
$Rw$ is the pitch radius of the worm wheel.

5. A worm-gear-type speed reduction device for use on elevators of the type including a rope and motor driven pulley comprising a worm shaft operatively engaging with a worm wheel to turn said pulley, one end of said worm shaft being supported by a single plane bearing of the type permitting axial and rotative movement, the other end of said worm shaft being drivingly connected to a drive shaft on a motor by resilient connection means, the middle portion of said worm shaft having gearing for engagement with gearing on said worm wheel, thrust bearing means supporting the motor against thrust forces transmitted from said worm shaft to said motor, said resilient connection means being positioned between flanged couplings provided at the worm shaft and the drive shaft respectively for allowing axial movement of said worm shaft resulting from misalignment of the worm gearing on said worm wheel and said worm shaft.

6. A device according to claim 5, wherein said resilient means comprises a plurality of cylindrical rubber members disposed symmetrically with respect to one another.

7. A device according to claim 5, wherein said resilient means comprises a single annular rubber member disposed symmetrically with respect to the axes of both said drive shaft and said worm shaft.

8. A device according to claim 5, wherein said thrust bearing means are disposed at the opposite side of the motor with respect to the drive shaft and in axial alignment with said drive shaft.

* * * * *